(12) United States Patent
Waltman

(10) Patent No.: US 8,267,312 B2
(45) Date of Patent: Sep. 18, 2012

(54) M-COMMERCE VIRTUAL CASH SYSTEM, METHOD, AND APPARATUS

(75) Inventor: Joan T. Waltman, Rancho Santa Fe, CA (US)

(73) Assignee: QUALCOMM Incorporated, San Diego, CA (US)

(*) Notice: Subject to any disclaimer, the term of this patent is extended or adjusted under 35 U.S.C. 154(b) by 130 days.

(21) Appl. No.: 12/853,487

(22) Filed: Aug. 10, 2010

(65) Prior Publication Data

US 2010/0306110 A1    Dec. 2, 2010

Related U.S. Application Data

(63) Continuation of application No. 12/434,157, filed on May 1, 2009, which is a continuation of application No. 11/376,981, filed on Mar. 15, 2006, now Pat. No. 7,552,867.

(51) Int. Cl.
*G06Q 40/00* (2006.01)
(52) U.S. Cl. .................. 235/379; 235/380; 235/383
(58) Field of Classification Search ............... 235/379, 235/380, 383; 705/39, 40, 42
See application file for complete search history.

(56) References Cited

U.S. PATENT DOCUMENTS

| | | |
|---|---|---|
| 5,208,446 A | 5/1993 | Martinez |
| 5,221,838 A | 6/1993 | Gutman et al. |
| 5,387,784 A | 2/1995 | Sarradin |
| 5,598,475 A | 1/1997 | Soenen et al. |
| 6,078,806 A | 6/2000 | Heinonen et al. |
| 6,315,195 B1 | 11/2001 | Ramachandran |
| 6,331,972 B1 | 12/2001 | Harris et al. |
| 6,434,159 B1 | 8/2002 | Woodward et al. |
| 6,636,833 B1 | 10/2003 | Flitcroft et al. |
| 6,877,661 B2 | 4/2005 | Webb et al. |
| 6,980,655 B2 | 12/2005 | Farris et al. |
| 6,999,569 B2 | 2/2006 | Risafi et al. |
| 7,021,534 B1 | 4/2006 | Kiliccote |
| 7,069,001 B2 | 6/2006 | Rupp et al. |
| 7,072,854 B2 | 7/2006 | Loeser |
| 7,159,770 B2 | 1/2007 | Onozu |
| 7,552,867 B2 | 6/2009 | Waltman |
| 2001/0051915 A1 | 12/2001 | Ueno et al. |
| 2002/0116344 A1* | 8/2002 | Kinoshita et al. ............... 705/65 |
| 2003/0191712 A1 | 10/2003 | Ohmae |
| 2004/0030601 A1 | 2/2004 | Pond et al. |

(Continued)

FOREIGN PATENT DOCUMENTS

JP    2001250064 A    9/2001

(Continued)

OTHER PUBLICATIONS

Written Opinion—PCT/US07/064108, International Search authority—European Patent Office. Sep. 5, 2007.

(Continued)

*Primary Examiner* — Ahshik Kim
(74) *Attorney, Agent, or Firm* — Nicholas A. Cole

(57) ABSTRACT

A virtual cash system, method, and apparatus for establishing account records containing a record of money amounts associated with a wireless device and a security code comprising a code portion to verify a deposit of money. Cash transfers between account records may be subject to restrictions associated with the cash amounts. Restrictions may include the specific merchant identifications, product type identifications for which cash transfers may be made. Alternatively, the restrictions may include spending limits on each cash transfer.

16 Claims, 2 Drawing Sheets

U.S. PATENT DOCUMENTS

| | | |
|---|---|---|
| 2005/0107067 A1 | 5/2005 | Redneker |
| 2005/0187873 A1 | 8/2005 | Labrou et al. |
| 2008/0195536 A1 | 8/2008 | Karns et al. |
| 2009/0224033 A1 | 9/2009 | Waltman |
| 2010/0241563 A1 | 9/2010 | Waltman |

FOREIGN PATENT DOCUMENTS

| | | |
|---|---|---|
| JP | 2001331756 A | 11/2001 |
| JP | 2002189963 A | 7/2002 |
| JP | 2002197388 A | 7/2002 |
| JP | 2004533050 A | 10/2004 |
| JP | 2004348325 A | 12/2004 |
| JP | 2005141314 A | 6/2005 |
| RU | 2172522 | 8/2001 |
| RU | 2263959 | 11/2005 |
| WO | WO02086785 | 10/2002 |
| WO | 03023674 | 3/2003 |
| WO | 03048881 | 6/2003 |

OTHER PUBLICATIONS

International Preliminary Report on Patentability—PCT/US07/064108—International Bureau of WIPO—Switzerland—Sep. 16, 2008.

European Search Report—EP1004409, Search Authority—Munich Patent Office, Nov. 12, 2010.

International Search Report—PCT/US07/064108, International Search Authority—European Patent Office—Sep. 5, 2007.

* cited by examiner

M-COMMERCE VIRTUAL CASH SYSTEM, METHOD, AND APPARATUS

This application is a continuation of U.S. patent application Ser. No. 12/434,157, filed May 1, 2009, entitled "M-COMMERCE VIRTUAL CASH SYSTEM, METHOD, AND APPARATUS", which is a currently pending continuation, which claims priority to then pending U.S. patent application Ser. No. 11/376,981, filed Mar. 15, 2006, entitled "M-COMMERCE VIRTUAL CASH SYSTEM, METHOD, AND APPARATUS", issued as U.S. Pat. No. 7,552,867 and granted on Jun. 30, 2009. The foregoing described applications are herein incorporated by reference in their entirety

BACKGROUND

The term "m-commerce" is beginning to find meanings in wireless mobile communication environments that are analogous to "e-commerce" solutions. An increasing number of m-commerce solutions are emerging in which a wireless device may be used to transact certain commercial transactions, such as simple financial transactions like store couponing, credit card transactions, automated clearing house (ACH) funds transfer transactions used like a check with bank routing information, and the like.

The term "wireless device" herein means cellular, cordless, Personal Communication System (PCS), or other types of wireless telephone devices, pagers, wireless personal digital assistants, notebook computers with wireless access, or any other wireless device, two-way radios, walkie-talkies, or other type of communications transceiver, or mobile stations (MS), regardless of whether they have valid subscriber identification module (SIM) or UTMS subscriber identification module (USIM) identifiers. Wireless devices are becoming so widespread it is estimated there will be about 1.7 billion mobile phone subscribers worldwide by 2007. In fact, recently, wireless devices with limited telephone capabilities have been made available for even grade-school level students.

At the same time, card-like devices, herein referred to simply as "cards", are finding increasing use to make life easier for individuals and merchants in an increasingly mobile society. Cards come in many forms, such as those having a stripe of magnetic material formed on a plastic base or substrate, those having an embedded integrated circuit with memory capabilities, and the like. Examples of cards in widespread use include credit cards, debit cards, telephone cards, cash cards, and gift or general purchase cards, generally useful at a particular store and which are now sold in kiosks, grocery stores, and elsewhere for various other stores, such as hardware, electronics, florists, and so forth.

Because of the ease with which cards may be used, they are often preferred by merchants as a way to accept payment for services and merchandise. In some cases, cards may be preferred, in fact, even to receiving cash payments, for many reasons. Cards generally result in automatic payments directly into an account of the merchant without requiring the handling of cash and the attendant problems associated therewith. By using cards, merchants do not need to provide as high a security level as would be required if large amounts of cash were kept on the premises. The use of cards also increases the accuracy of record keeping, reduces change-making errors, and, with the present card infrastructures in place, reduces the time required to handle cash transactions. The use of cards also simplifies record keeping requirements for most commercial transactions.

In these environments, what is needed is an expansion of m-commerce applications using the card technologies and infrastructures, and more specifically, an expansion of m-commerce technologies to handle or replace cash and card transactions.

BRIEF DESCRIPTION OF THE DRAWINGS

In the figures, like reference numerals are used to designate like or similar parts.

DETAILED DESCRIPTION

Figure 1:
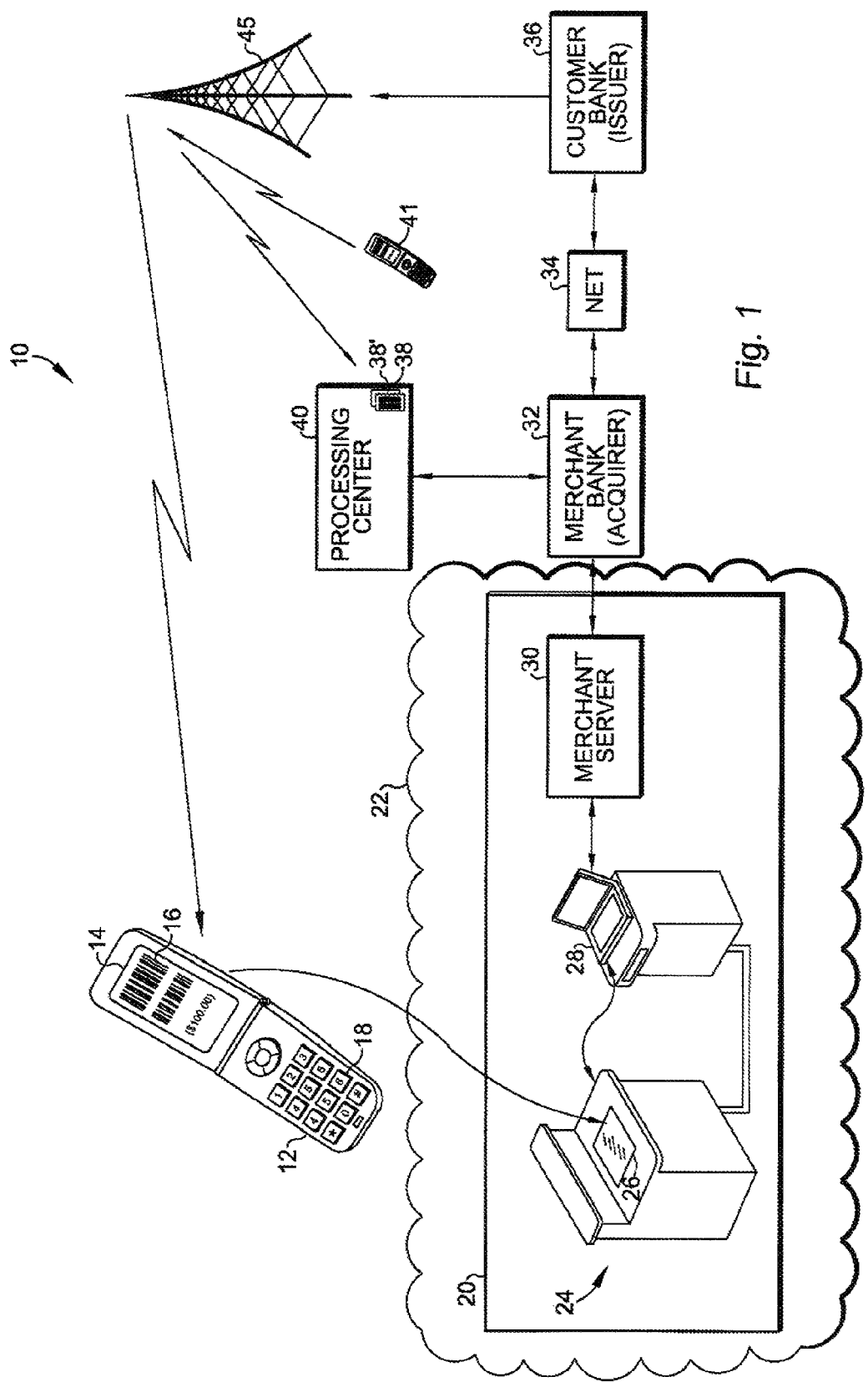
FIG. 1 is a block diagram showing a financial transaction system having a wireless device by which cash payments can be made or by which indicia that provides a virtual cash equivalent can be displayed.

According to a broad aspect of one embodiment of the system, method, and apparatus described herein, a wireless device is provided by which cash payments can be made or by which indicia that provide a virtual cash equivalent can be displayed for use in making cash payments, without the attendant problems described above of handling cash itself.

Because some overlap exists in definitions, for ease of description, the words "money", "currency", and "cash" are used herein with the following meanings.

Money means something generally accepted as a medium of exchange, a measure of value, or a means of payment. "Money" is used synonymously herein with "funds". Examples of money include the basic concept of something of value represented by dollars and cents, pounds and shillings, yen, pesos, and so forth, as well as book or ledger entries representing the same by which financial transactions may be accomplished by respective debits and credits. Additionally included are instruments that are payable on demand, such as checks, or the like.

Currency means something that is in circulation as a medium of money exchange. For example, currency includes physical one, ten, hundred, and so on dollar bills, one, five, ten, fifty, one hundred yen coins, and so forth.

Cash means either ready money or ready currency. For instance, cash includes checks and currency that is presently in hand.

Additionally, the term "virtual cash" herein means an indicia, like a bar code, a radio or a light spectrum signal, or other machine readable entity or form, that represents or is immediately useable and accepted in place of cash in a transaction in which money is exchanged for goods, services, or other purpose. Virtual cash does not include credit cards or other transaction forms in which a promise to pay or repay in the future is exchanged for goods, services, or other purpose. Virtual cash is not intended to imply that the money represented thereby is not real or hypothetical; however, the money represented by the virtual cash is not actually physically present or currently in hand.

Most, if not all, of the infrastructure needed to realize at least some embodiments of such virtual cash system using a wireless device is presently in place, and only specific application software need be added to realize specific desired features. Such system may be accomplished in a number of ways. In one embodiment, a scanable bar code 16 may be provided on the display screen 14 of a wireless device 12, shown in FIG. 1. As described below, the bar code 16 provides information that can be used or spent in place of actual cash. In another embodiment, a direct cash transfer may be initiated via the user interface, such as a keypad 18 or writeable surface (not shown) of the wireless device 12. In yet another embodiment, 802.11, Bluetooth, LAN capabilities, or other short range radio signal technique may be used in the wireless device 12 and appropriately equipped receiving equipment (not shown). Likewise, infrared (IR), or other modulated light signal technique, may be used in the wireless device 12 and appropriately equipped receiving equipment (not shown).

One embodiment of a system, method, and apparatus described herein is shown in FIG. 1, to which reference is now made. The system 10 includes a point of sale (POS) location 20 of a merchant 22. The POS location 20 may include a check-out station 24 having typical existing equipment, such as a bar code scanner 26 and control and display device 28 associated therewith. The point of sale equipment may also include a server 30 through which the check-out station 24, and other check out stations (not shown) at the POS 20, or other POSs that may also exist (not shown), can be operated.

A bar code system is described in the embodiment shown in FIG. 1, since most wireless devices include a display that may be used directly, or, with minor modification, to display scanable bar code information, as described below. Additionally, most POS equipment has the ability to read bar codes. Therefore, existing infrastructure may be used without the need for new equipment in order to facilitate the data interchange required to complete cash transactions of the type described herein.

More particularly, normal POS card transactions may be processed through a service center, which may be operated by a credit/debit/banking company, such as MasterCard, Visa, American Express, or the like. The service center may be, for example, a network service that would normally serve to authorize credit card transactions. The service center also generally serves as a clearing and settlement service that would normally transfer payment information between a merchant bank 32 and a customer bank 36.

Card transactions are normally handled in two stages. The first stage is an approval stage in which the cardholder (not shown) presents the card to the merchant 22 to pay for purchases. The merchant 22 then swipes the card and enters the dollar amount of the purchase. Then, an authorization request is transmitted to the merchant bank 32, sometimes referred to as an "acquirer". The acquirer is a financial institution or merchant bank that contracts with the merchant 22 for card acceptance and enables card payments from customers.

In the case of credit card transactions, the acquirer sends the authorization request to a network 34 that routes the authorization request to the customer bank 36, sometimes referred to as the "issuer". The issuer is a financial institution that issues cards and maintains a contract with cardholders for repayment.

The issuer 36 then approves or declines the authorization request, and sends the approving or declining response back through the network 34 to the acquirer 32. The acquirer 32 then sends the approving or declining response back to the merchant 22. If the authorization has been approved, the process is allowed to continue to the second stage for clearing and settlement.

In the clearing and settlement stage, the merchant 22 deposits the transaction receipt with the acquirer 32. The transactions may be deposited using paper copies, but may be electronically transmitted for automatic settlement. The acquirer 32 then credits the merchant's account, and electronically submits the transaction to the network service 34 for settlement. Existing network services 34 may, for example, act as an authorization service for card transactions, as described above, but as a clearing and settlement service, as well, to transfer payment information between parties. Typically, the network service 34 pays the acquirer 32 and debits the issuer account, then sends the transaction to the issuer 36. The issuer 36 then posts the transaction to the cardholder's account.

Although the virtual cash system, method, and apparatus 10 described herein might be used in such a credit/debit card environment, according to one embodiment the wireless device 30 can be used in a manner by which cash payments can be made or by which indicia that provide a virtual cash equivalent can be displayed for use in making direct cash payments. In this embodiment, a substantial portion of the authorization stage previously employed in the credit/debit card transaction described above can be minimized, or eliminated.

To this end, a preestablished cash purchase amount is employed. The preestablished cash purchase amount may be kept in an account record 38 that associates a predetermined cash balance with the particular wireless device 12. The account record may be maintained by a transaction processing center 40, which may be operated in a similar manner to existing purchase card processing centers. An example of operations performed by such purchase card processing center may be seen in U.S. Pat. No. 6,999,569, which is incorporated herein by reference. In some embodiments, the actual account record may be maintained in a memory of the wireless device itself or elsewhere; however, security may be more easily monitored and maintained if the account record is managed by a separate processing center under the control of trusted financial institutions, as described herein.

Unlike purchasing cards, the wireless device 12 has a display 14 on which available cash information can be displayed in the form of bar code information 16 that can be read by a merchant's scanner equipment 26. As mentioned, existing equipment may be employed with appropriate software modifications. For example, the wireless device 12 may be equipped with an appropriate Application Programming Interface (API) to configure the wireless device 12 to hold the available cash information in its memory and to display the required bar code information 16 on its display 14.

On the other hand, the equipment of the merchant 22 may be modified with appropriate software to recognize the transaction as a cash payment transaction. This embodiment enables the use of a transaction processing center 40 to operate in a manner similar to a purchasing card transaction, which allows the first stage credit card authorization process described above to be bypassed.

More particularly, the bar code information 14 may typically contain, for example, account identification information, a security code, an available cash amount, or combination thereof. The account identification information may be, for instance, a PIN number selected by the user, a phone number of the wireless device, some form of a Mobile Identification Number (MIN), an Electronic Serial Number (ESN), identification information derived therefrom, an actual account number, or some other identifying information by which the account with the wireless device by which the transaction is to be made can be associated with the account record 38.

As indicated above, in addition to indicating the available cash information, the bar codes 16 may include security information. The security information may be, for example, a form of rolling code that is changed with every transaction and which is be synchronized with a code at the processing center to which the security information is sent to at least in part, verify the point of sale transaction. The rolling code may be employed as a security measure to protect both the customer and the merchant.

In a typical operation, the rolling code may be sent with each transaction, but is updated after each transaction, so that it is not the same from one transaction to the next. Such codes can be received and decoded by the processing center to verify that the code is a proper one. In this way, if someone in possession of the wireless device attempted to foil the system by defeating the rolling code change, a second transaction based upon the same rolling code as an earlier transaction would be rejected.

A suitable rolling code may be adapted, for instance, from a rolling code of the type described in U.S. Pat. No. 5,598,475, which is incorporated by reference herein. For greater security, both fixed and rolling codes may be used, such as, for example, a code adapted from code arrangement of the type described in U.S. Pat. No. 6,980,655, which is incorporated by reference herein. The fixed portion of the security code may be provided, for example, by the customer's bank 36 when confirming the deposit of the predetermined funds at the customer's direction. Other security codes, rolling codes, or other type of security or verification technique may, of course, be equally advantageously employed.

The available cash amount may be simply a bar code indicting the amount of money that is contained in the account 38 that is available for spending.

In addition, other information may optionally be displayed on the screen 14, depending upon the particular application being considered, the ease of use to be facilitated, and the space available on the screen. For example, a human readable form of the available cash may be displayed for verification by the purchaser or by the merchant before attempting to complete a transaction. Routing information to the customer bank 36 may also be displayed, if needed. Other information may also be displayed, as well.

Thus, some or all of the bar code information may be used by the processing center 40 to verify the transaction, for example, to ensure that the security code checked out and sufficient funds exist in the mobile device account to complete the transaction. The verification could be in the form simply as an "accept" indication if a sufficient amount of money exists in the account 38 for the purchase or a "reject" indication if the balance is overrun. On the other hand, the verification may return a number indicating the amount of money that can be applied to the purchase, leaving the balance to be made up by the purchaser.

Although the money balance information would be kept at the processing center, the actual amount would be established by the user. The money balance may be established, for example, by authorizing the customer bank 36 to move either the money itself to the processing center 40 to be associated with the account 38 or by an authorization to withdraw the money, as spent, from the customer bank 36 payable to the merchant bank 32 to be credited to the merchant's account.

In one embodiment, money may be moved directly into the account 38 by third party devices 41 who make direct payments, for example, from their own respective wireless device cash accounts 38' to the account 38 associated with the wireless device 12. If desired, the account holder may require that a maximum balance be maintained in the account 38 such that excess amounts deposited to the account 38 be refunded back directly into the account holder's account at the customer bank 36.

As mentioned, the wireless device 12 is configured so that cash payments can be made or so that indicia that provide a virtual cash equivalent can be displayed for use in making cash payments. Consequently, if the wireless device is regarded as representing or carrying cash itself, as suggested above, one embodiment provides that no identification or other sort of user authentication need be required. That is, the actual money amount is associated with the wireless device, not the user. Because of this characteristic, carrying the virtual cash represented in the wireless device has some of the same risks as carrying cash itself. Thus, for example, if the wireless device is lost, a finder may be able to spend the virtual cash just as if it were actual cash in a lost wallet or purse.

Nevertheless, some of the risks of carrying cash may be reduced. For example, if the wireless device is lost, there is a chance that the cash value can be preserved if the issuer 36 is notified before a finder makes purchases. In such cases, the account record 38 in the processing center may be modified to decline authorization for purchases made on that account. Additionally, since the account 38 contains only a limited predetermined money amount, the extent of liability for a lost wireless device is limited to that predetermined amount. The limit may be, for example, established by the owner of the wireless device, who can balance his own comfort level of risk to the amount of money that he places in his account, in the same manner as deciding how much actual cash he is comfortable carrying.

Figure 2:
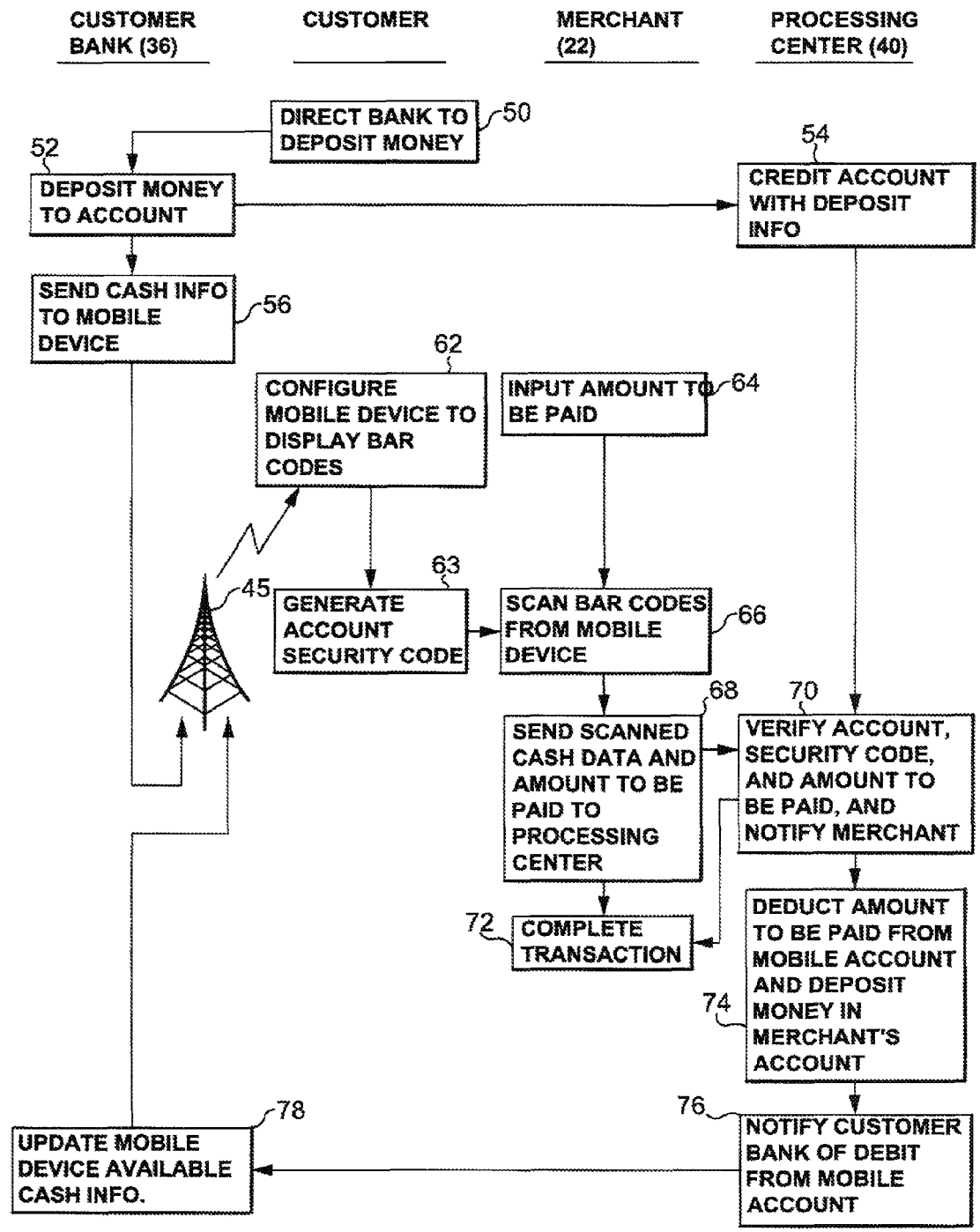
FIG. 2 is a flow chart showing the interrelationship among various actions taken by a customer bank, a customer, a merchant, and a processing center in conducting an m-commerce cash or virtual cash transaction.

One embodiment of a method for making cash transactions of the type described is illustrated in FIG. 2, to which reference is now additionally made. After a cash account 38 is set up with a processing center 40, the customer directs his bank 36 to credit the account with a predetermined amount of money, as shown in box 50. The customer's bank 36 then credits the account 38 associated with the customer's wireless device 12 according to the customer's direction, shown in box 52. This may be accomplished directly, or via direction to the processing center 40 to credit the account with the deposited funds, as shown in box 54.

As shown in box 56, the customer's bank 36 then sends cash information to the customer's wireless device via a wireless system 45 indicating that the predetermined amount of money has been transferred into the customer's account 38. The cash information may be stored, for example, in a memory of the customer's wireless device. As mentioned, as a part of the cash information, the customer's bank 36 may also include a bank security code that can be incorporated into a security code that may be sent by the wireless device 12 to the processing center 40 to verify a spending transaction. Thus, when the processing center 40 updates the customer account information with the deposit information, as shown in box 54, it may also associate the bank security code, if sent.

When the customer wishes to make a purchase, he first configures his wireless device, as shown in box 62, to display the bar codes 16 on his display screen 14 required to be scanned. The wireless device 12 may be configured, for example, by running the API that accesses the memory in which the cash information has been stored to generate and display the appropriate bar codes 16 on the display 14 of the wireless device 12.

If a security code is also to be sent to assist in verifying the transaction, in addition to indicating the available cash information, the bar codes 16 may be configured to include the security code. The security code may be generated as a part of the device configuration process, as shown in box 63.

While the customer is configuring his wireless device 12 to display the bar codes, as described above, the merchant 22 enters the amount that the customer is to pay, shown in box 64, for example, via the control and display device 28. The merchant then scans the bar code 16 displayed on the customer's wireless device 12, shown in box 66. As shown in box 68, the merchant, or the merchant's equipment, then sends information derived from the scanned bar code 16, together with the amount to be paid, to the processing center 40, which, as shown in box 70, verifies the bar code 16 information, identifies the customer account 38 against which the purchase is to be debited, and verifies that the required funds are on deposit to complete the transaction.

The processing center 40 then notifies the merchant 22 according to the predefined notification rules, for example, that there are sufficient funds, that there are not sufficient funds, or that a certain funds amount is available for the transaction. The merchant then completes the transaction, shown in box 72.

Meanwhile, the processing center 40 settles the transaction by debiting the amount to be paid from the customer's account 38 and depositing the amount to be paid in the merchant's account, as shown in box 74. The processing center 40 then notifies the customer's bank 36 of the transaction, shown in box 76. The customer's bank then wirelessly updates the wireless device information, as shown in box 78, via a wireless network, such as the wireless network 45. For example, if the amount to be paid is less than the preauthorized cash amount, the remaining amount in the customer's account is determined, for instance, by the processing center, and the remaining balance is transmitted to the wireless device for additional spending. If the entire amount has been depleted, that fact may also be sent to notify the customer that he needs to have additional money transferred to his wireless device account 38 if additional purchases are to be made.

At this juncture, it should be noted that although only one wireless network 45 has been shown, wireless networks are ubiquitous and the wireless device 12 can be virtually anywhere, while still being in communication with the customer bank 36. Thus, one of the advantages derived from this embodiment is that the overall use of the virtual cash apparatus and system of the type described is not geographically limited, so long as wireless service is available. Moreover, although the notification transactions have been described as being conducted by the customer's bank, it should be appreciated that such notification transactions may be performed by any other entity, such as the processing center 40 itself, or other entity that is tasked with the account update responsibility.

Virtual cash systems of the type described have a number of other advantages, in addition making cash purchases at diverse point of sale locations as described above. For example, as suggested above, using the keypad 18 or other user interface of the wireless device, a user may transfer money directly into a wireless device account of another user. Thus, for example, cash payments can be made directly to wireless device accounts of casual service providers, such as domestic workers, baby sitters, or the like. Children's allowance may be paid by transferring money directly to an account associated with their individual wireless devices. Additionally, preauthorized spending limits may be established by parents with regard to their children's wireless device accounts; for example, children's spending may be limited to the purchase of food at a school cafeteria, or to the purchase of particular discretionary expenses at certain authorized merchants. Other uses will be immediately apparent to those skilled in the art.

It should be noted that although a bar code implementation has been described in detail, the account identification information, security code, and available cash amount indicators can be in other forms that may be recognized by the merchant's equipment. For example, an alternative embodiment one or more of the indicators may be implemented wholly or partially by rfid radio links, which are well known, that transfer data to proximity readers.

In yet another alternative embodiment, any or all of the account identification information, security code, and available cash amount indicators may be displayed on the display of the wireless device in a picture format which can be recognized, for example, as a series of alphanumeric characters that can be manually entered by the merchant as a part of the sales transaction.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A method for imposing restrictions on virtual cash transmitted from a first wireless device to a second wireless device, comprising:
   establishing a first account record at a processing center which is associated with the first wireless device, the first account record comprising:
      a first amount of virtual cash; and
      a first security code, wherein the first security code comprises a first fixed code portion to verify a first deposit of money corresponding to the first amount of virtual cash;
   establishing at the processing center a second account record which is associated with the second wireless device, the second account record comprising:
      a second amount of virtual cash; and
      a second security code, wherein the second security code comprises a second fixed code portion to verify a second deposit of money corresponding to the second amount of virtual cash;
   transferring a third amount of virtual cash from the first account record to the second account record; and
   receiving a restriction associated with the third amount of virtual cash comprising an identification of one more merchants in which the third amount of virtual cash may be spent.

2. A method for imposing restrictions on virtual cash transmitted from a first wireless device to a second wireless device, comprising:
   establishing a first account record at a processing center which is associated with the first wireless device, the first account record comprising:
      a first amount of virtual cash; and
      a first security code, wherein the first security code comprises a first fixed code portion to verify a first deposit of money corresponding to the first amount of virtual cash;
   establishing at the processing center a second account record which is associated with the second wireless device, the second account record comprising:
      a second amount of virtual cash; and
      a second security code, wherein the second security code comprises a second fixed code portion to verify a second deposit of money corresponding to the second amount of virtual cash;
   transferring a third amount of virtual cash from the first account record to the second account record; and receiving a restriction associated with the third amount of virtual cash comprising an identification of one or more product types that may be purchased with the third amount of virtual cash.

3. A method for imposing restrictions on virtual cash transmitted from a first wireless device to a second wireless device, comprising:
  establishing a first account record at a processing center which is associated with the first wireless device, the first account record comprising:
    a first amount of virtual cash; and
    a first security code, wherein the first security code comprises a first fixed code portion to verify a first deposit of money corresponding to the first amount of virtual cash;
  establishing at the processing center a second account record which is associated with the second wireless device, the second account record comprising:
    a second amount of virtual cash; and
    a second security code, wherein the second security code comprises a second fixed code portion to verify a second deposit of money corresponding to the second amount of virtual cash;
  transferring a third amount of virtual cash from the first account record to the second account record; and
  receiving a restriction associated with the third amount of virtual cash comprising receiving preauthorized spending limits associated with the third amount of virtual cash.

4. A method for imposing restrictions on virtual cash transmitted from a first wireless device to a second wireless device, comprising:
  establishing a first account record at a processing center which is associated with the first wireless device, the first account record comprising:
    a first amount of virtual cash; and
    a first security code, wherein the first security code comprises a first fixed code portion to verify a first deposit of money corresponding to the first amount of virtual cash;
  establishing at the processing center a second account record which is associated with the second wireless device, the second account record comprising:
    a second amount of virtual cash; and
    a second security code, wherein the second security code comprises a second fixed code portion to verify a second deposit of money corresponding to the second amount of virtual cash;
  transferring a third amount of virtual cash from the first account record to the second account record; and
  receiving a restriction associated with the third amount of virtual cash from a communication originating from the first wireless device.

5. A non-transitory computer-readable storage medium having stored thereon processor-executable software instructions configured to cause a processor to perform operations comprising:
  establishing a first account record at a processing center which is associated with the first wireless device, the first account record comprising:
    a first amount of virtual cash; and
    a first security code, wherein the first security code comprises a first fixed code portion to verify a first deposit of money corresponding to the first amount of virtual cash;
  establishing at the processing center a second account record which is associated with the second wireless device, the second account record comprising:
    a second amount of virtual cash; and
    a second security code, wherein the second security code comprises a second fixed code portion to verify a second deposit of money corresponding to the second amount of virtual cash;
  transferring a third amount of virtual cash from the first account record to the second account record;
  receiving a restriction associated with the third amount of virtual cash; and
  receiving an identification of one more merchants in which the third amount of virtual cash may be spent.

6. A non-transitory computer-readable storage medium having stored thereon processor-executable software instructions configured to cause a processor to perform operations comprising:
  establishing a first account record at a processing center which is associated with the first wireless device, the first account record comprising:
    a first amount of virtual cash; and
    a first security code, wherein the first security code comprises a first fixed code portion to verify a first deposit of money corresponding to the first amount of virtual cash;
  establishing at the processing center a second account record which is associated with the second wireless device, the second account record comprising:
    a second amount of virtual cash; and
    a second security code, wherein the second security code comprises a second fixed code portion to verify a second deposit of money corresponding to the second amount of virtual cash;
  transferring a third amount of virtual cash from the first account record to the second account record;
  receiving a restriction associated with the third amount of virtual cash; and
  receiving an identification of one or more product types that may be purchased with the third amount of virtual cash.

7. A non-transitory computer-readable storage medium having stored thereon processor-executable software instructions configured to cause a processor to perform operations comprising:
  establishing a first account record at a processing center which is associated with the first wireless device, the first account record comprising:
    a first amount of virtual cash; and
    a first security code, wherein the first security code comprises a first fixed code portion to verify a first deposit of money corresponding to the first amount of virtual cash;
  establishing at the processing center a second account record which is associated with the second wireless device, the second account record comprising:
    a second amount of virtual cash; and
    a second security code, wherein the second security code comprises a second fixed code portion to verify a second deposit of money corresponding to the second amount of virtual cash;
  transferring a third amount of virtual cash from the first account record to the second account record;
  receiving a restriction associated with the third amount of virtual cash; and
  receiving preauthorized spending limits associated with the third amount of virtual cash.

8. A non-transitory computer-readable storage medium having stored thereon processor-executable software instructions configured to cause a processor to perform operations comprising:
    establishing a first account record at a processing center which is associated with the first wireless device, the first account record comprising:
        a first amount of virtual cash; and
        a first security code, wherein the first security code comprises a first fixed code portion to verify a first deposit of money corresponding to the first amount of virtual cash;
    establishing at the processing center a second account record which is associated with the second wireless device, the second account record comprising:
        a second amount of virtual cash; and
        a second security code, wherein the second security code comprises a second fixed code portion to verify a second deposit of money corresponding to the second amount of virtual cash;
    transferring a third amount of virtual cash from the first account record to the second account record; and
    receiving a restriction associated with the third amount of virtual cash from a communication originating from the first wireless device.

9. A system for imposing restrictions on virtual cash transmitted from a first wireless device to a second wireless device, comprising:
    means for establishing a first account record at a processing center which is associated with the first wireless device, the first account record comprising:
        a first amount of virtual cash; and
        a first security code, wherein the first security code comprises a first fixed code portion to verify a first deposit of money corresponding to the first amount of virtual cash;
    means for establishing at the processing center a second account record which is associated with the second wireless device, the second account record comprising:
        a second amount of virtual cash; and
        a second security code, wherein the second security code comprises a second fixed code portion to verify a second deposit of money corresponding to the second amount of virtual cash;
    means for transferring a third amount of virtual cash from the first account record to the second account record; and
    means for receiving an identification of one or more merchants in which the third amount of virtual cash may be spent.

10. A system for imposing restrictions on virtual cash transmitted from a first wireless device to a second wireless device, comprising:
    means for establishing a first account record at a processing center which is associated with the first wireless device, the first account record comprising:
        a first amount of virtual cash; and
        a first security code, wherein the first security code comprises a first fixed code portion to verify a first deposit of money corresponding to the first amount of virtual cash;
    means for establishing at the processing center a second account record which is associated with the second wireless device, the second account record comprising:
        a second amount of virtual cash; and
        a second security code, wherein the second security code comprises a second fixed code portion to verify a second deposit of money corresponding to the second amount of virtual cash;
    means for transferring a third amount of virtual cash from the first account record to the second account record; and
    means for receiving an identification of one or more product types that may be purchased with the third amount of virtual cash.

11. A system for imposing restrictions on virtual cash transmitted from a first wireless device to a second wireless device, comprising:
    means for establishing a first account record at a processing center which is associated with the first wireless device, the first account record comprising:
        a first amount of virtual cash; and
        a first security code, wherein the first security code comprises a first fixed code portion to verify a first deposit of money corresponding to the first amount of virtual cash;
    means for establishing at the processing center a second account record which is associated with the second wireless device, the second account record comprising:
        a second amount of virtual cash; and
        a second security code, wherein the second security code comprises a second fixed code portion to verify a second deposit of money corresponding to the second amount of virtual cash;
    means for transferring a third amount of virtual cash from the first account record to the second account record; and
    means for receiving preauthorized spending limits associated with the third amount of virtual cash.

12. A system for imposing restrictions on virtual cash transmitted from a first wireless device to a second wireless device, comprising:
    means for establishing a first account record at a processing center which is associated with the first wireless device, the first account record comprising:
        a first amount of virtual cash; and
        a first security code, wherein the first security code comprises a first fixed code portion to verify a first deposit of money corresponding to the first amount of virtual cash;
    means for establishing at the processing center a second account record which is associated with the second wireless device, the second account record comprising:
        a second amount of virtual cash; and
        a second security code, wherein the second security code comprises a second fixed code portion to verify a second deposit of money corresponding to the second amount of virtual cash;
    means for transferring a third amount of virtual cash from the first account record to the second account record; and
    means for receiving a restriction associated with the third amount of virtual cash from a communication originating from the first wireless device.

13. A processing center for imposing restrictions on virtual cash transmitted from a first wireless device to a second wireless device, comprising:
    a computer processor operable to:
        establish a first account record at a processing center which is associated with the first wireless device, the first account record comprising:
            a first amount of virtual cash; and a first security code, wherein the first security code comprises a first fixed code portion to verify a first deposit of money corresponding to the first amount of virtual cash;

establish at the processing center a second account record which is associated with the second wireless device, the second account record comprising:

a second amount of virtual cash; and a second security code, wherein the second security code comprises a second fixed code portion to verify a second deposit of money corresponding to the second amount of virtual cash;

transfer a third amount of virtual cash from the first account record to the second account record; and receive a restriction associated with the third amount of virtual cash in the form of an identification of one more merchants in which the third amount of virtual cash may be spent.

14. A processing center for imposing restrictions on virtual cash transmitted from a first wireless device to a second wireless device, comprising:

a computer processor operable to:

establish a first account record at a processing center which is associated with the first wireless device, the first account record comprising:

a first amount of virtual cash; and a first security code, wherein the first security code comprises a first fixed code portion to verify a first deposit of money corresponding to the first amount of virtual cash;

establish at the processing center a second account record which is associated with the second wireless device, the second account record comprising:

a second amount of virtual cash; and a second security code, wherein the second security code comprises a second fixed code portion to verify a second deposit of money corresponding to the second amount of virtual cash;

transfer a third amount of virtual cash from the first account record to the second account record; and receive a restriction associated with the third amount of virtual cash in the form of an identification of one or more product types that may be purchased with the third amount of virtual cash.

15. A processing center for imposing restrictions on virtual cash transmitted from a first wireless device to a second wireless device, comprising:

a computer processor operable to:

establish a first account record at a processing center which is associated with the first wireless device, the first account record comprising:

a first amount of virtual cash; and a first security code, wherein the first security code comprises a first fixed code portion to verify a first deposit of money corresponding to the first amount of virtual cash;

establish at the processing center a second account record which is associated with the second wireless device, the second account record comprising:

a second amount of virtual cash; and a second security code, wherein the second security code comprises a second fixed code portion to verify a second deposit of money corresponding to the second amount of virtual cash;

transfer a third amount of virtual cash from the first account record to the second account record; and receive a restriction associated with the third amount of virtual cash in the form of preauthorized spending limits associated with the third amount of virtual cash.

16. A processing center for imposing restrictions on virtual cash transmitted from a first wireless device to a second wireless device, comprising:

a computer processor operable to:

establish a first account record at a processing center which is associated with the first wireless device, the first account record comprising:

a first amount of virtual cash; and a first security code, wherein the first security code comprises a first fixed code portion to verify a first deposit of money corresponding to the first amount of virtual cash;

establish at the processing center a second account record which is associated with the second wireless device, the second account record comprising:

a second amount of virtual cash; and a second security code, wherein the second security code comprises a second fixed code portion to verify a second deposit of money corresponding to the second amount of virtual cash;

transfer a third amount of virtual cash from the first account record to the second account record; and receive a restriction associated with the third amount of virtual cash from a communication originating from the first wireless device.

* * * * *